US007206714B2

(12) United States Patent
Aoki

(10) Patent No.: US 7,206,714 B2
(45) Date of Patent: Apr. 17, 2007

(54) EXHAUST GAS SENSOR CONTROL DEVICE

(75) Inventor: Keiichiro Aoki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/529,282

(22) PCT Filed: Sep. 1, 2004

(86) PCT No.: PCT/JP2004/013016

§ 371 (c)(1),
(2), (4) Date: Mar. 25, 2005

(87) PCT Pub. No.: WO2005/022141

PCT Pub. Date: Mar. 10, 2005

(65) Prior Publication Data

US 2006/0047468 A1 Mar. 2, 2006

(30) Foreign Application Priority Data

Sep. 1, 2003 (JP) ............................ 2003-309012

(51) Int. Cl.
*G01K 1/08* (2006.01)
*G06F 15/00* (2006.01)

(52) U.S. Cl. ...................................................... 702/132

(58) Field of Classification Search ................. 702/132
See application file for complete search history.

(56) References Cited

U.S. PATENT DOCUMENTS 6,304,813 B1 * 10/2001 Ikeda et al. ................. 701/109
6,541,741 B2 4/2003 Ikeda
2002/0005064 A1 * 1/2002 Ohkuma ...................... 73/116
2003/0070423 A1 * 4/2003 Morinaga et al. ............. 60/284
2004/0099528 A1 * 5/2004 Hattori ....................... 204/401

FOREIGN PATENT DOCUMENTS

| | | |
|---|---|---|
| JP | A 61-241652 | 10/1986 |
| JP | A 62-071852 | 4/1987 |
| JP | A 64-016959 | 1/1989 |
| JP | A 04-365951 | 12/1992 |
| JP | A 05-231230 | 9/1993 |
| JP | A 06-011482 | 1/1994 |

(Continued)

*Primary Examiner*—John Barlow
*Assistant Examiner*—Cindy D. Khuu
(74) *Attorney, Agent, or Firm*—Oliff & Berridge, PLC

(57) ABSTRACT

A control device for an exhaust gas sensor is provided to judge the deterioration of a sensor element in real time and promptly complete an activity judgment in an exhaust gas sensor warm-up sequence without resort to learning. An air-fuel ratio sensor is mounted in an exhaust path of an internal combustion engine. The air-fuel ratio sensor is equipped with a sensor element that becomes active when an activity temperature is reached. If the activity of the air-fuel ratio sensor is not judged, a judgment is made whether an element impedance Z of the sensor element is not greater than an activity judgment value Zact (condition A), and whether an intake air amount cumulative value GAsum is not smaller than a sensor activity judgment intake air amount cumulative value GAsumtg (condition B). When either of the two conditions is satisfied, activity of the air-fuel ratio sensor is judged.

11 Claims, 13 Drawing Sheets

FOREIGN PATENT DOCUMENTS

| | | |
|---|---|---|
| JP | A 09-113481 | 5/1997 |
| JP | A 10-026599 | 1/1998 |
| JP | A 2002-048761 | 2/2002 |
| JP | A 2002-071633 | 3/2002 |
| JP | A 2003-120408 | 4/2003 |
| JP | A 2003-232257 | 8/2003 |
| JP | A 2004-177179 | 6/2004 |

* cited by examiner

FIG. 10

TWI-BASED GAsumtg MAP

| TWI [℃] | -10 | 25 | 80 |
|---|---|---|---|
| GAsumtg [g/sec] | 10000 | 5000 | 300 |

GAsumtg MAP BASED ON TWI AND BVsm

| VBsm [V] \ TWI [℃] | -10 | 25 | 80 |
|---|---|---|---|
| 10 | 12500 | 7500 | 500 |
| 12 | 11000 | 6000 | 400 |
| 14 | 10000 | 5000 | 300 |

EXHAUST GAS SENSOR CONTROL DEVICE

TECHNICAL FIELD

The present invention relates to a device for controlling an exhaust gas sensor that is mounted in an exhaust path of an internal combustion engine, and more particularly to an exhaust gas sensor control device suitable for controlling an exhaust gas sensor having a sensor element that becomes active when its activity temperature is reached.

BACKGROUND ART

A conventionally known system, which is disclosed, for instance, by Japanese Patent Laid-Open No. 48761/2002, exercises feedback control over a fuel injection amount in accordance with a value detected by an air-fuel ratio sensor that is mounted in an exhaust path of an internal combustion engine. The air-fuel ratio sensor is equipped with a sensor element, which becomes active when heated to an activity temperature, and a heater, which heats the sensor element. This conventional system makes use of a correlation between the sensor element temperature and element impedance to exercise feedback control over the electrical power supply to the heater in order to ensure that the sensor element reaches a predetermined target impedance value. The target impedance is a sensor element impedance that prevails at the activity temperature. When this heater control method is used, it is possible to maintain the sensor element at the activity temperature and steadily keep the air-fuel ratio sensor active.

The above sensor element decreases the element impedance when its temperature increases and increases the element impedance when it deteriorates. Therefore, if the sensor element deteriorates, the element impedance does not decrease to the target impedance when the sensor element reaches its activity temperature. If, in such an instance, heater feedback control is continuously exercised while the target impedance remains unchanged, the sensor element will be heated to a temperature above the activity temperature.

To avoid the above situation, the above conventional system concludes, if the heater is continuously activated for a period longer than predetermined during heater feedback control, that the sensor element is deteriorated, and then increases the target impedance for correction purposes. When this process is performed, it is possible to quickly detect an element impedance increase in the course of sensor element deterioration, increase the target impedance in accordance with sensor element deterioration, and effectively prevent the sensor element from being overheated.

When the above conventional system begins to exercise feedback control over the fuel injection amount by making use of an air-fuel ratio sensor output, it is necessary to judge whether the sensor element is active. This activity judgment can be made, for instance, by monitoring the element impedance after internal combustion engine startup and checking whether the monitored element impedance value is lowered to a predetermined activity judgment value. However, the above-mentioned temperature characteristic is superposed over the element impedance. Therefore, if the activity judgment value is fixed, the same problem arises as in a case where control is exercised until the element impedance coincides with the target impedance. More specifically, the element impedance increases as the sensor element deteriorates; therefore, the activity judgment will be delayed.

Such a delayed activity judgment directly delays the beginning of fuel injection amount feedback control. To obtain an excellent emission characteristic in the internal combustion engine, it is preferred that fuel injection amount feedback control begin as soon as possible. In this respect, the use of the conventional activity judgment method may readily degrade the internal combustion engine's emission characteristic in accordance with air-fuel ratio sensor deterioration.

The delay in activity judgment can be corrected, for instance, by applying the above conventional system's target impedance correction method to the activity judgment value. More specifically, the delay in activity judgment, which is caused by sensor element deterioration, can be avoided by increasing the activity judgment value when sensor element deterioration is detected during an internal combustion engine operation, storing the increased activity judgment value, and using the stored activity judgment value to execute an activity judgment at the next internal combustion engine startup.

However, when the above method is used, before heater feedback control begins (that is, before the sensor element temperature is close to the activity temperature), sensor element deterioration cannot be detected, thereby the influence of deterioration cannot be reflected in the activity judgment. In other words, the activity judgment value correction is constantly delayed by one trip so that the sensor element deterioration cannot be reflected in the activity judgment method in real time at internal combustion engine startup.

Further, to implement the above method, it is necessary to perform a process for correcting the activity judgment value and storing the corrected value, that is, to perform an activity judgment value learning process and exercise complicated control. Moreover, the activity judgment will be delayed until the activity judgment value learning process is completed if the corrected activity judgment value is cleared due to battery replacement or the like according to the above method.

The present invention has been made to solve the above problems. It is an object of the present invention to provide an exhaust gas sensor control device that is capable of determining the degree of sensor element deterioration in real time and executing a prompt activity judgment at all times in an exhaust gas sensor warm-up sequence without resort to activity judgment value learning.

DISCLOSURE OF INVENTION

To achieve the above object, an exhaust gas sensor control device according to the present invention includes a sensor element that is mounted in an exhaust path of an internal combustion engine and becomes active when it reaches an activity temperature. The control device according to the present invention also includes an impedance detection device for detecting the element impedance of the sensor element and an impedance judgment device for judging whether the element impedance is lowered to an activity judgment value. Further, the control device according to the present invention includes a received heat amount estimation device for estimating the amount of heat received by the sensor element, a heat amount judgment device for judging whether an activity judgment heat amount is reached by the received heat amount, and an activity judgment device for formulating an activity judgment of the exhaust gas sensor when a judgment is formulated by either the impedance judgment device or the heat amount judgment device.

BRIEF DESCRIPTION OF DRAWINGS

FIG. 10 is a typical map illustrating a sensor activity judgment intake air amount GAsumtg that is referenced when the routine shown in FIG. 7 is executed;

BEST MODE FOR CARRYING OUT THE INVENTION

First Embodiment

[Hardware Configuration of First Embodiment]

Figure 1:
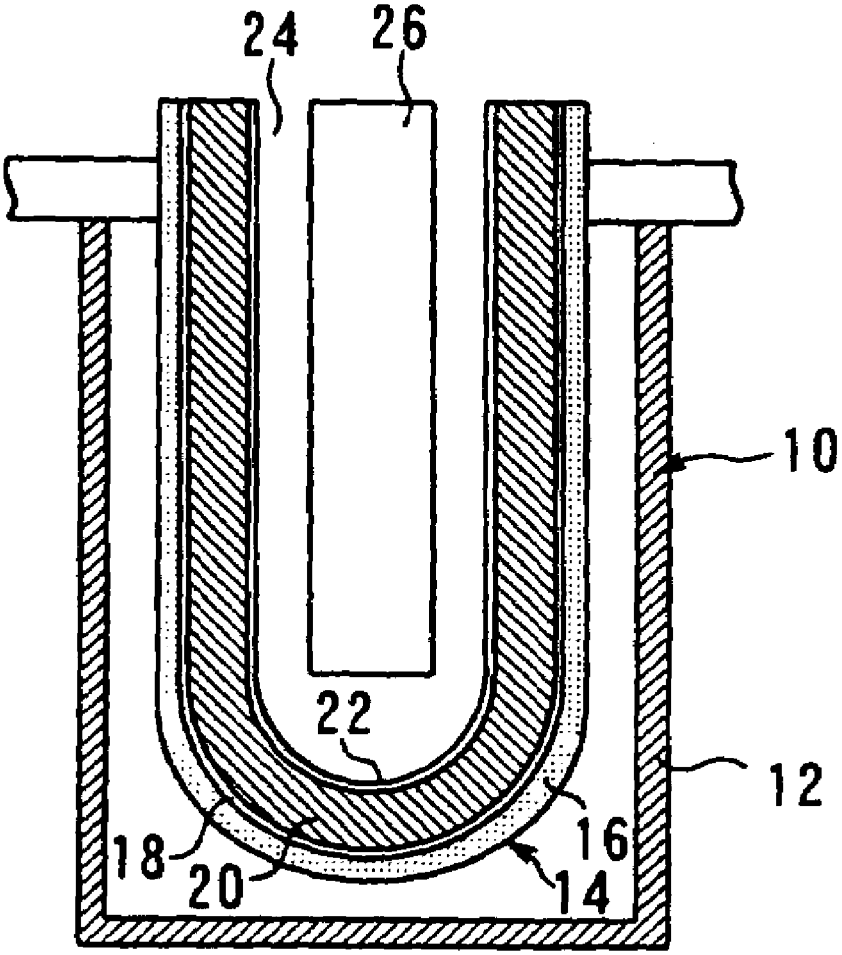
FIG. 1 illustrates the configuration of an air-fuel ratio sensor that is used in a first embodiment of the present invention.

FIG. 1 illustrates the configuration of an air-fuel ratio sensor 10 that is used in a first embodiment of the present invention. The air-fuel ratio sensor shown in FIG. 1 is mounted in an exhaust path of an internal combustion engine and used to detect the air-fuel ratio of an exhaust gas. The air-fuel ratio sensor 10 is provided with a cover 12. The air-fuel ratio sensor 10 is mounted in the exhaust path so that the cover 12 is exposed to the exhaust gas.

The cover 12 is provided with a hole (not shown) for introducing the exhaust gas inward. A sensor element 14 is positioned inside the cover 12. The sensor element 14 has a tubular structure whose one end (lower end in FIG. 1) is closed. The outer surface of the tubular structure is covered with a diffused resistor layer 16. The diffused resistor layer 16 is made of alumina or other heat-resistant porous substance. It controls the diffusion speed of the exhaust gas near the surface of the sensor element 14.

The inside of the diffused resistor layer 16 is provided with an exhaust-end electrode 18, a solid electrolyte layer 20, and an atmospheric-air-end electrode 22. The exhaust-end electrode 18 and atmospheric-air-end electrode 22 are made of Pt or other highly catalytic, precious metal. These electrodes are electrically connected to a control circuit, which will be described later. The solid electrolyte layer 20 is a sintered body that contains $ZrO_2$ and the like. It permits the passage of oxygen ions.

An atmospheric chamber 24, which is exposed to atmospheric air, is formed inside the sensor element 14. A heater 26 for heating the sensor element 14 is mounted in the atmospheric chamber 24. The sensor element 14 exhibits a stable output characteristic at an activity temperature of approximately 700° C. The heater 26 is electrically connected to a control circuit, which will be described later. The control circuit exercises control of the heater 26 so that the sensor element 14 is heated and maintained at an appropriate temperature.

Figure 2:
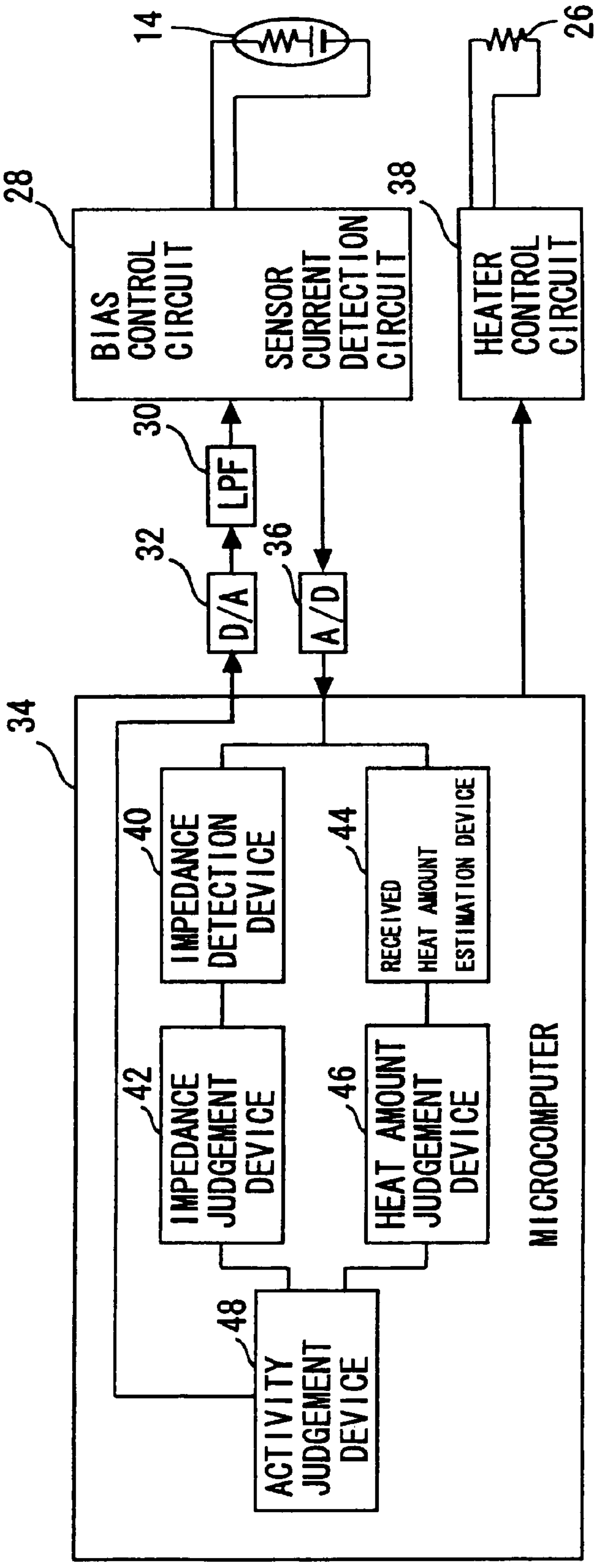
FIG. 2 illustrates the overall configuration of a control device according to the first embodiment of the present invention.

FIG. 2 is a block diagram illustrating the configuration of a control device for the air-fuel ratio sensor 12. As shown in FIG. 2, the sensor element 14 can be equivalently expressed with a resistance component and electromotive component. Further, the heater 26 can be equivalently expressed with a resistance component. A sensor element drive circuit 28 is connected to the sensor element 14. The sensor element drive circuit 28 includes a bias control circuit for applying a desired voltage to the sensor element 14 and a sensor current detection circuit for detecting a current flow in the sensor element 14.

A microcomputer 34 is connected to the bias control circuit, which is included in the sensor element control circuit 28, via a low-pass filter (LPF) 30 and a D/A converter 32. The microcomputer 34 can issue an instruction, through such components, to the bias control circuit for the purpose of specifying the voltage to be applied to the sensor element 14.

In compliance with a command from the microcomputer 34, the bias control circuit can apply a bias voltage for air-fuel ratio detection and an impedance detection voltage to the sensor element 14. When the air-fuel ratio detection bias voltage is applied to the sensor element 14, the sensor element 14 conducts a sensor current that corresponds to the air-fuel ratio of the exhaust gas. Therefore, when the sensor current is detected, it is possible to detect the air-fuel ratio of the exhaust gas.

When the bias voltage applied to the sensor element 14 is changed from the air-fuel ratio detection bias voltage to the impedance detection voltage, the sensor current changes in accordance with a change in the applied voltage. In this instance, the ratio between the applied voltage change amount and sensor current change amount corresponds to the element impedance of the sensor element. Therefore, the element impedance of the sensor element can be detected by detecting the sensor current, which arises when the impedance detection voltage is applied.

The sensor current detection circuit incorporated in the sensor element control circuit 28 is connected to the microcomputer 34 via A/D converter 36. The microcomputer 34 can read via the A/D converter 36 a sensor current that is detected by the sensor current detection circuit. Therefore, while an air-fuel ratio detection voltage is applied to the sensor element 14, the microcomputer 34 can detect the exhaust gas air-fuel ratio in accordance with the sensor current. While the impedance detection voltage is applied to the sensor element 14, the microcomputer 34 can detect the element impedance in accordance with the sensor current.

As shown in FIG. 2, a heater control circuit 38 is connected to the heater 26. The heater control circuit 38 is connected to the microcomputer 34. Upon receipt of a command from the microcomputer 34, the heater control circuit 38 can supply a drive signal to the heater 26 in compliance with the command for the purpose of generating a desired amount of heat in the heater 26.

[Heater Control in First Embodiment]

Figure 3:
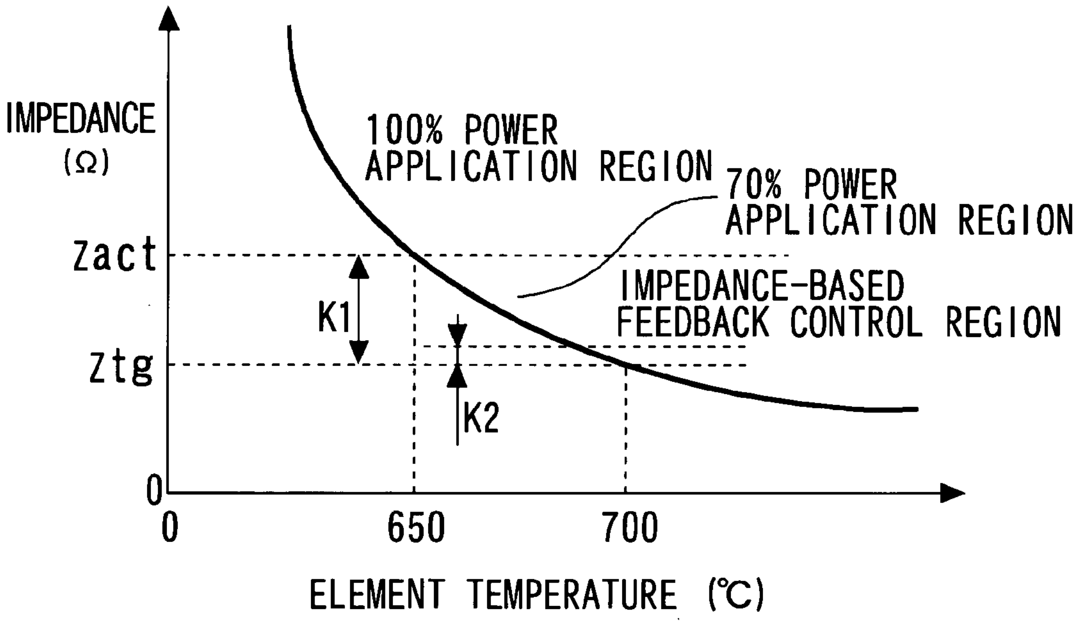
FIG. 3 illustrates the element impedance temperature characteristic of an air-fuel ratio sensor.

FIG. 3 provides an overview of heater control that is exercised in a device according to the present embodiment. The curve shown in FIG. 3 indicates the relationship between the element impedance and element temperature. As indicated by the curve, the element impedance has such a temperature characteristic that the higher the element temperature rises, the smaller the element impedance value becomes. In FIG. 3, the symbols Zact and Ztg denote the activity judgment value and target impedance, respectively. The activity judgment value Zact is set to an element impedance that prevails when the element temperature coincides with an activity judgment temperature (e.g., 650° C.). The target impedance Ztg is set to an element impedance that prevails when the element temperature coincides with an activity target temperature (e.g., 700° C.).

The sensor element 14 exhibits such a sensor characteristic that the sensor element 14 is stable at a temperature that is not lower than the activity judgment temperature. Therefore, when the element reaches its activity judgment temperature (e.g., 650° C.) after internal combustion engine startup, the device according to the present embodiment judges the activation of the air-fuel ratio sensor 10 and begins to exercise air-fuel ratio feedback control in accordance with the sensor output. To provide a margin for element temperature changes, the sensor element 14 is subsequently heated to and maintained at an activity target temperature (e.g., 700° C.), which is higher than the activity judgment temperature. As a result, air-fuel ratio feedback control is exercised in a state where the element temperature is heated to approximately 700° C. in a stable state.

In the above instance, the microcomputer 34 makes use of the correlation between the element temperature and element impedance and judges whether the activity judgment temperature is reached by the element by determining whether the element impedance is lowered to a level prevailing at the activity judgment temperature Zact. To maintain the element at the activity target temperature, the microcomputer 34 also exercises feedback control over the amount of electrical power applied to the heater 26 in such a manner that the element impedance coincides with the target impedance Ztg.

To obtain an excellent emission characteristic in an internal combustion engine, it is preferred that the time interval between the instant at which warm up of the air-fuel ratio sensor 10 is started and the instant at which its activity judgment is formulated be as short as possible. Therefore, the device according to the present embodiment drives the heater 26 at 100% duty ratio in a region where the element impedance is greater than at the activity judgment temperature Zact (100% power application region shown in FIG. 3). When the element impedance subsequently lowers to a level prevailing at the activity judgment temperature Zact, the device according to the present embodiment continues to drive the heater 26 at 70% duty ratio for the purpose of preventing the sensor element 14 from being overheated (70% power application region shown in FIG. 3). When the element impedance is close to the target impedance Ztg, the heater 26 is continuously driven by exercising feedback control according to the element impedance (feedback control region shown in FIG. 3).

Figure 4:
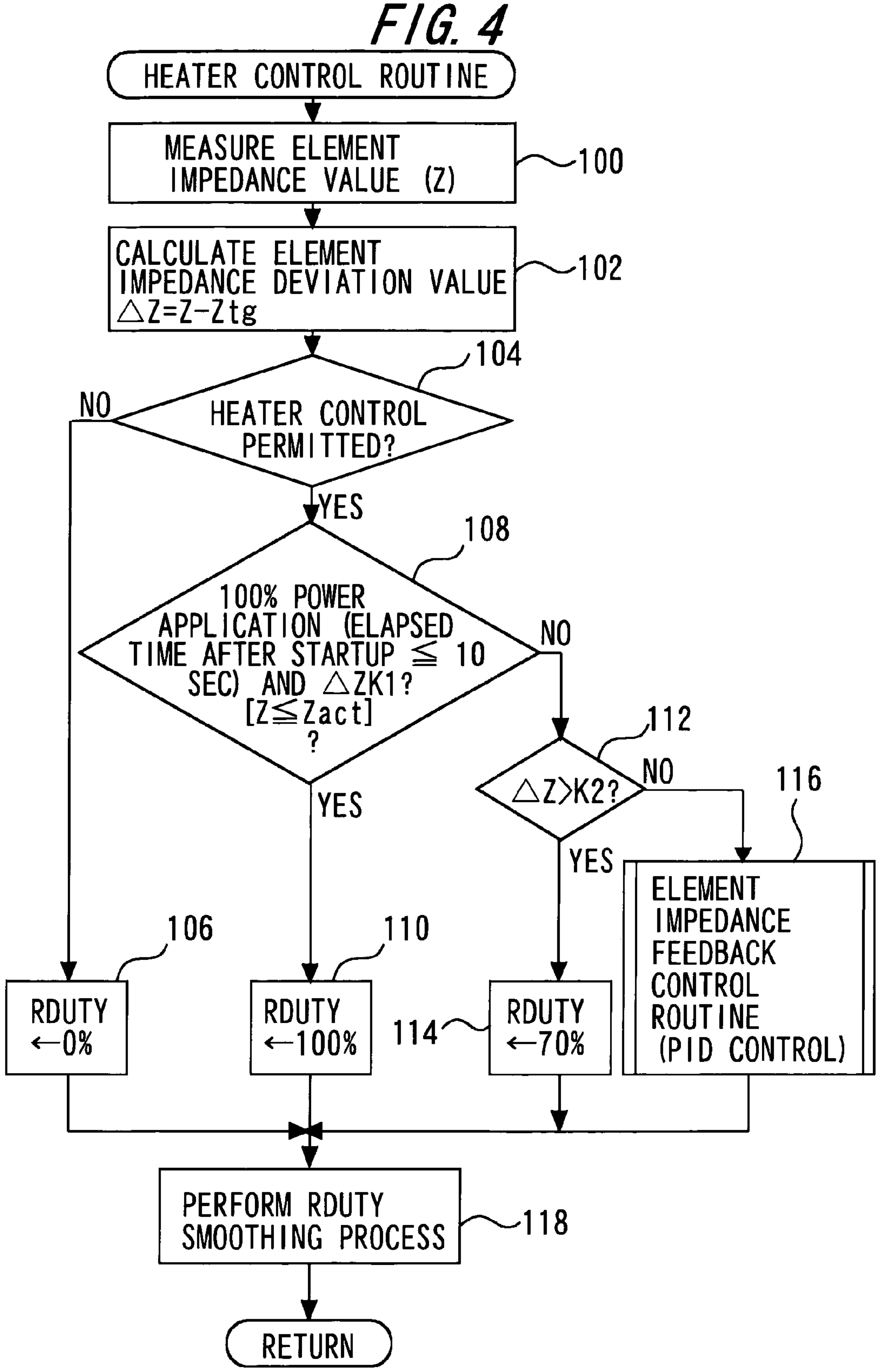
FIG. 4 is a flowchart illustrating a heater control routine that is executed in the first embodiment of the present invention.

FIG. 4 is a flowchart illustrating a heater control routine that the microcomputer 34 executes in order to exercise the above heater control. In the routine shown in FIG. 4, the element impedance Z is detected first (step 100). Next, the difference between the detected value Z and the target impedance Ztg ($\Delta Z = Z - Ztg$) is calculated (step 102). Step 104 is then performed to judge whether heater control permission conditions are satisfied. If the conditions are not satisfied, the drive duty ratio RDUTY for the heater 26 is set to 0% (step 106).

If, on the other hand, the judgment result obtained in step 104 indicates that the permission conditions are satisfied, step 108 is performed to judge whether 100% power application conditions are satisfied. More specifically, step 108 is performed to judge whether the elapsed time after internal combustion engine startup is equal to or shorter than 10 sec as well as the value ΔZ is equal to or larger than judgment value K1 (see FIG. 3) ($Z \geqq Zact$). If the obtained judgment result indicates that the above conditions are satisfied, step 110 is performed so that the drive duty ratio RDUTY for the heater 26 is set to 100%.

If the judgment result obtained in step 108 indicates that the 100% power application conditions are not satisfied, step 112 is performed to judge whether the value ΔZ is greater than judgment value K2 (see FIG. 3). More specifically, the step 112 is performed to judge whether the conditions for applying 70% power to the heater 26 are satisfied. If the obtained judgment result indicates that $\Delta Z > K2$, step 114 is performed so that the drive duty ratio RDUTY for the heater 26 is set to 70%.

If, on the other hand, the judgment result obtained in step 112 does not indicate that $\Delta Z > K2$, step 116 is performed to execute an element impedance feedback control routine. In this routine, the drive duty ratio RDUTY for the heater 26 is set by a PID control method so that the value ΔZ decreases, namely, the element impedance Z becomes close to the target impedance Ztg.

When the drive duty ratio RDUTY for the heater 26 is set in step 106, 110, 114, or 116, a process for smoothing the drive duty RDUTY is eventually performed (step 118). When such a smoothing process is performed, the power supply to the heater 26 is prevented from suddenly changing in a case where the drive duty ratio RDUTY, which is set in processes performed in step 106, 110, 114, and 116, shows stepping changes.

[Influence of Element Impedance Deterioration (Increase) and Control of the Influence]

Figure 5:
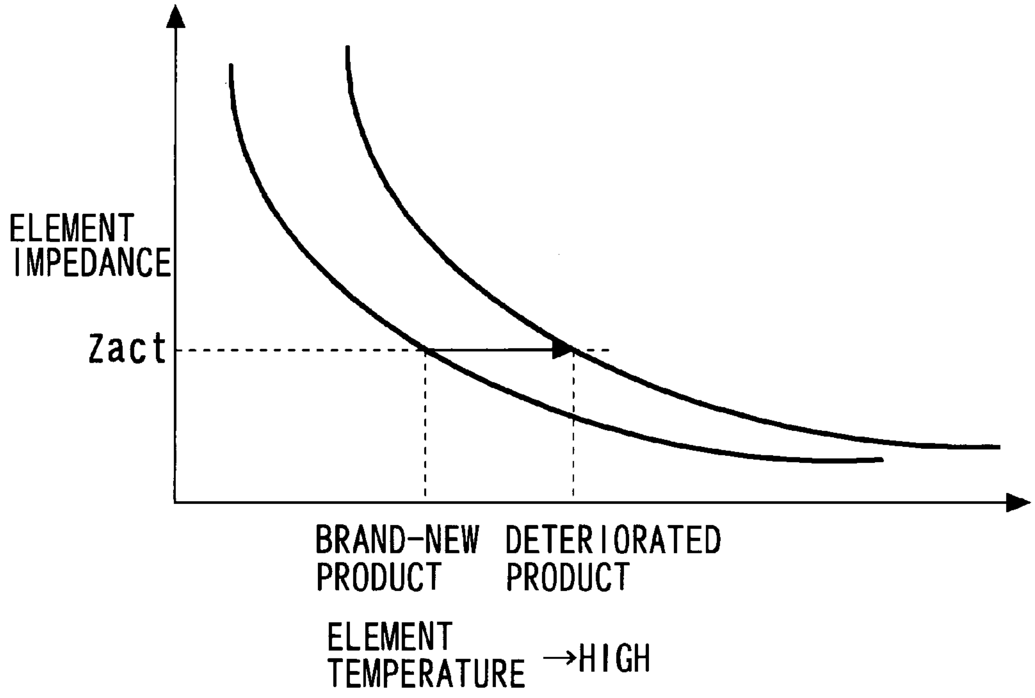
FIG. 5 illustrates the relationship between the element impedance temperature characteristic of an air-fuel ratio sensor and the deterioration of a sensor element.

FIG. 5 illustrates the relationship between the deterioration of the sensor element 14 and the element impedance. As indicated in the figure, the element impedance shifts in the increasing direction as the deterioration of the sensor element 14 progresses. Therefore, if the activity judgment value Zact remains constant, the element temperature for judging the activity of the sensor element 14 rises as the deterioration progresses, as indicated in FIG. 5.

Figure 6:
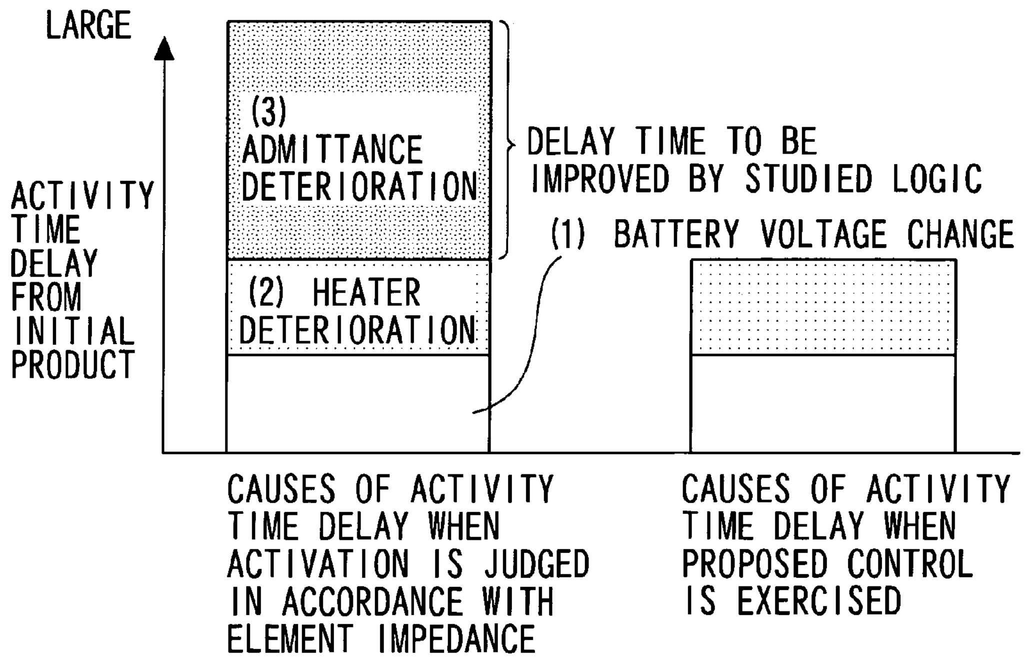
FIG. 6 illustrates the causes of delay in activity judgment according to the first embodiment of the present invention.

FIG. 6 illustrates the causes of delays in the time required for the element impedance to lower to a level prevailing at the activity judgment value Zact (which is considered to be constant) after the warm-up sequence of the sensor element 14 is started, that is, the causes of delays in the time required before the activation of the sensor element 14 is judged based on the element impedance. This figure also illustrates the proportions of delays arising out of various causes. As indicated in the figure, the time required for formulating the above judgment includes (1) a delay caused by a change in a battery voltage (namely, a delay caused by a decrease in the voltage applied to the heater 26), (2) a delay caused by the resistance deterioration of the heater 26 (namely, a delay caused by a decrease in the current flow in the heater 26), and (3) a delay caused by the admittance deterioration of the sensor element 14 (element impedance increase).

Delays (1) and (2) involve a delay in the temperature rise of the sensor element 14, that is, actually cause a delay in the time for allowing the element temperature to reach the activity judgment temperature. Delay (3), on the other hand, is a delay in the time interval between the instant at which the element reaches the activity judgment temperature and the instant at which it is concluded in accordance with the element impedance that the element's activity judgment temperature is reached. As shown in FIG. 6, the proportion of delay (3) is significantly large. Therefore, if the activity judgment of the sensor element 14 is formulated depending solely on whether the element impedance is lowered to a level prevailing at the activity judgment temperature Zact, a significantly great delay occurs due to the deterioration of the sensor element 14 during the time interval between the instant at which the element reaches the activity judgment temperature and the instant at which the activity judgment is actually formulated. It is preferred that such a delay be minimized wherever possible because it would unduly delay the start of air-fuel ratio feedback.

The warm-up state of the sensor element 14 correlates with the cumulative amount of heat that is received by the sensor element 14 after internal combustion engine startup. Therefore, whether or not the activity temperature of the sensor element 14 is reached can be determined in accordance with the amount of heat received by the sensor element 14 as well as with the element impedance. For the device according to the present embodiment, therefore, an activity judgment heat amount is predefined as a value for judging surely that the activity judgment temperature (e.g., 650° C.) is reached by the element. When it is estimated that the activity judgment heat amount is reached by the amount of heat received by the sensor element 14 after internal combustion engine startup, the device according to the present embodiment immediately concludes that the sensor element 14 is active even if the element impedance is not lowered to the activity judgment value Zact.

[Processing Peculiar to First Embodiment]

Figure 7:
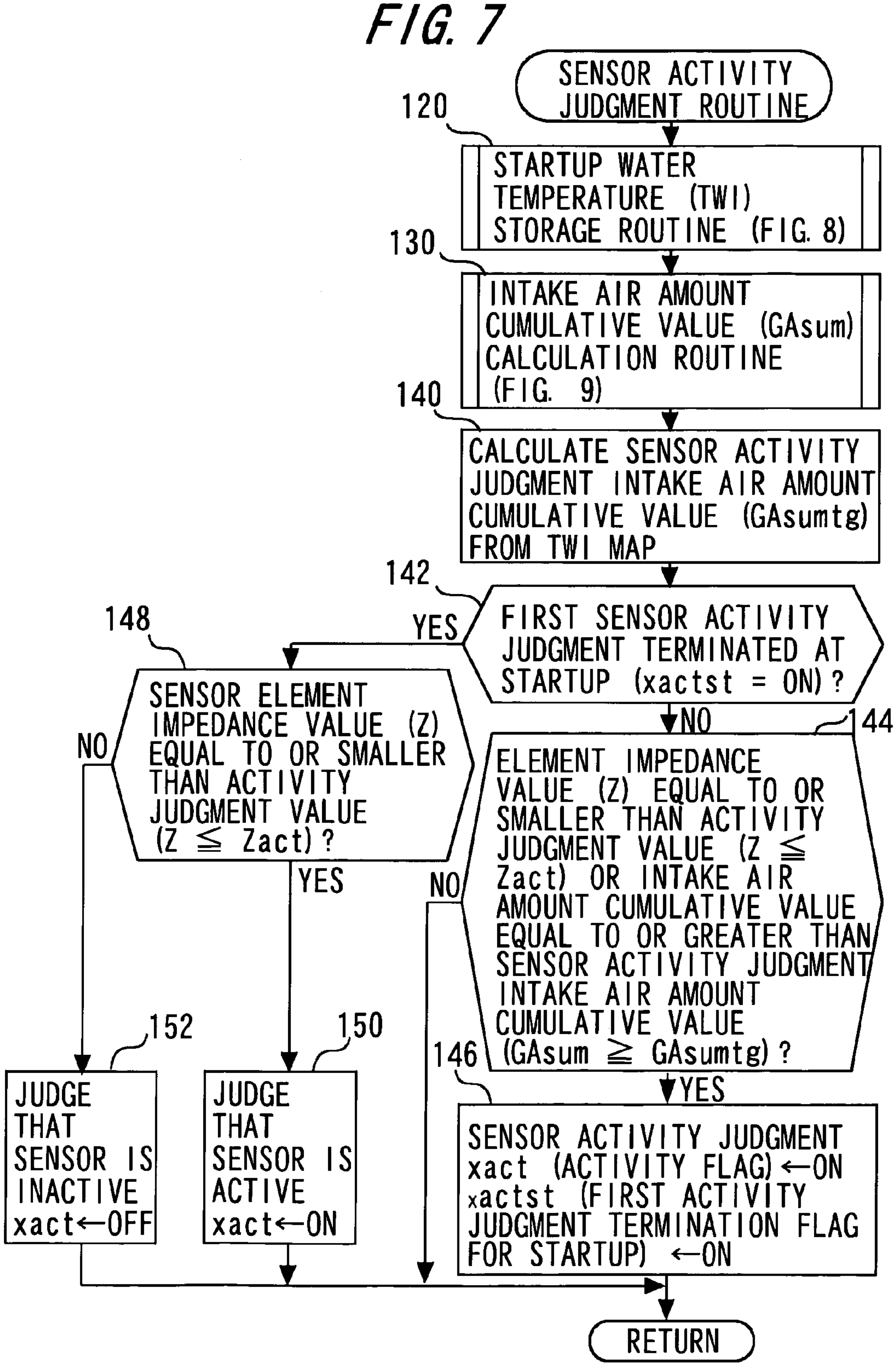
FIG. 7 is a flowchart illustrating a sensor activity judgment routine that is executed in the first embodiment of the present invention.

Processing operations performed by the microcomputer 34 to implement the above functionality will now be described with reference to FIGS. 7 through 10. FIG. 7 is a flowchart illustrating a sensor activity judgment routine that the microcomputer executes in accordance with the present embodiment. In the sensor activity judgment routine, step 120 is first performed to execute a startup water temperature (TWI) storage routine.

Figure 8:
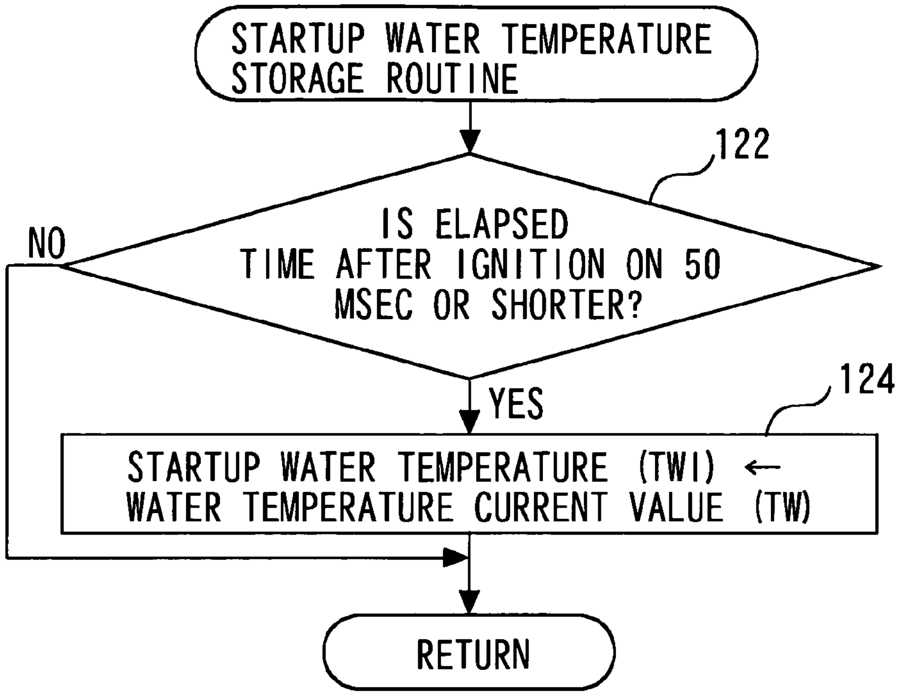
FIG. 8 is a flowchart illustrating a startup water temperature storage routine that is executed in the first embodiment of the present invention.

FIG. 8 is a flowchart illustrating a startup water temperature storage routine that is executed in step 120. In this routine, step 122 is first performed to judge whether the elapsed time after internal combustion engine ignition switch (IG) ON is shorter than 50 msec. If the obtained judgment result indicates that the above condition is satisfied, step 124 is performed to formulate an internal combustion engine startup judgment and store the current cooling water temperature TW as the startup water temperature TWI. If, on the other hand, the above condition is not satisfied, the current processing cycle comes to an end without performing any process.

In the routine shown in FIG. 7, after the startup water temperature storage routine is terminated, step 130 is performed to execute an intake air amount cumulative value (GAsum) calculation routine. The intake air amount cumulative value calculation routine calculates the cumulative value GAsum of the intake air amount GA that has been generated after internal combustion engine startup. When the intake air amount cumulative value GAsum is great, it means that the elapsed time after internal combustion engine startup is long, and that the heater 26 has been powered for a long period of time. The fact that the intake air amount cumulative value GAsum is great means that a large amount of exhaust gas has circulated around the air-fuel ratio sensor 10 after internal combustion engine startup. The longer the period of time during which the heater 26 is powered, the larger the amount of heat received by the sensor element 14 becomes. Further, the amount of heat received by the sensor element 14 generally increases with an increase in the amount of exhaust gas circulation. In the present embodiment, therefore, the intake air amount cumulative value reference GAsum can be used as a substitute for the amount of heat received by the sensor element 14.

Figure 9:
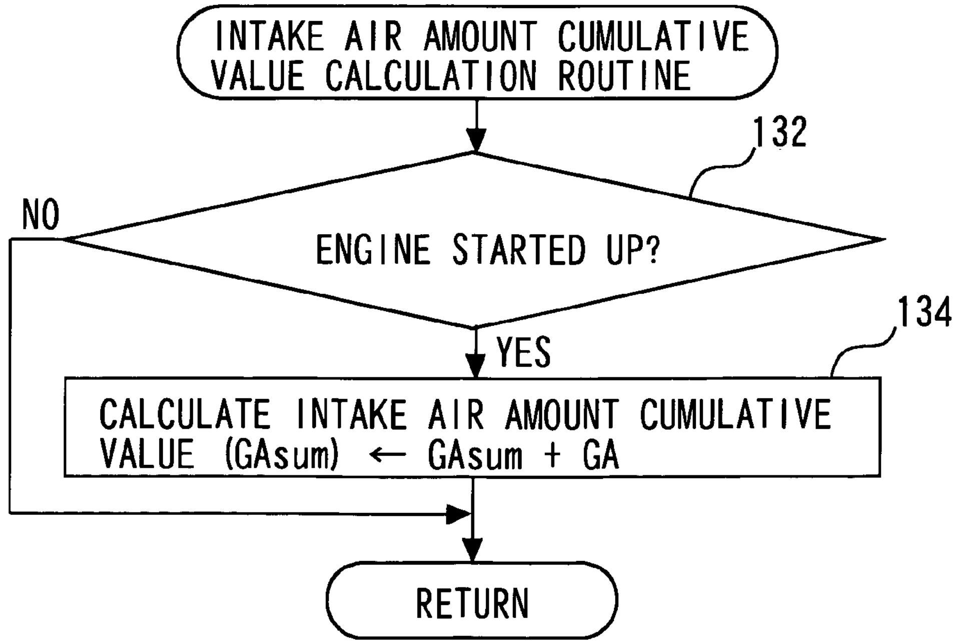
FIG. 9 is a flowchart illustrating an intake air amount cumulative value calculation routine that is executed in the first embodiment of the present invention.

FIG. 9 is a flowchart illustrating an intake air amount cumulative value calculation routine that is executed in step 130. In this routine, step 132 is first performed to judge whether the internal combustion engine is already started. If the obtained judgment result indicates that the above condition is satisfied, the intake air amount cumulative value GAsum is updated by adding the intake air amount GA detected in the current processing cycle to the GAsum value that was calculated in the preceding processing cycle (step 134). If, on the other hand, the above condition is not satisfied, the current processing cycle comes to an end without performing any process.

In the routine shown in FIG. 7, after the intake air amount cumulative value calculation routine is terminated, step 140 is performed to calculate a sensor activity judgment intake air amount cumulative value (GAsumtg). The sensor activity judgment intake air amount cumulative value (GAsumtg) is predefined as the minimum value for an intake air amount cumulative value GAsum that is adequate for concluding that the activity temperature is reached by the sensor element 14. In other words, the value GAsumtg is a judgment value that is selected as appropriate for assuring the activity judgment of the sensor element 14 when GAsum≧GAsumtg.

FIG. 10 is a typical map illustrating the GAsumtg value that the microcomputer 34 stores in accordance with the present embodiment. This map uses the startup cooling water temperature TWI as a parameter and is organized so that the lower the value TWI is, the greater the value GAsumtg becomes. The amount of heat to be received during the interval between the instant at which the internal combustion is started up and the instant at which the activity temperature is reached by the sensor element 14 increases with a decrease in the element temperature prevailing at internal combustion engine startup. According to the map shown in FIG. 10, the startup cooling water temperature TWI becomes lower, that is, the amount of receiving heat needed before the sensor element 14 reaches its activity temperature becomes larger, a greater value can be set as the sensor activity judgment intake air amount cumulative value GAsumtg. In the device according to the present embodiment, therefore, it is always possible to set the GAsumtg to the minimum GAsum value that is adequate for concluding that the activity temperature is reached by the sensor element 14 without regard to the element temperature prevailing at the beginning of warm-up.

In the routine shown in FIG. 7, it is judged next whether the first activity judgment is already formulated after internal combustion engine startup. More specifically, step 142 is performed to judge whether an activity judgment end flag xactst is already ON. The activity judgment end flag xactst turns ON when the activity judgment of the sensor element 14 is formulated for the first time after internal combustion engine startup.

If the obtained judgment result does not indicate that the activity judgment end flag xactst is ON, step 144 is performed to judge whether at least either of conditions A and B below is satisfied.

Condition A—Whether the element impedance Z is equal to or smaller than the activity judgment value Zact (Z≦Zact?);

Condition B—Whether the intake air amount cumulative value GAsum is equal to or greater than the sensor activity judgment intake air amount cumulative value GAsumtg (GAsum≧GAsumtg?)

If the obtained judgment result indicates that neither condition A nor condition B is satisfied, it is concluded that the activity temperature is still not reached by the sensor element 14. The current processing cycle then comes to an immediate end. If, on the other hand, the obtained judgment result indicates that either condition A or condition B is satisfied, step 146 is performed to formulate the activity judgment of the sensor element 14 and turn ON both the activity judgment flag xact and activity judgment end flag xactst.

Condition A is established so as to be satisfied when the sensor element 14 reaches the activity judgment temperature while the sensor element 14 exhibits an initial impedance characteristic. As regards the impedance characteristic of the sensor element 14, a certain degree of tolerance (e.g., 10%) is provided. Even at an initial stage, therefore, the satisfaction of condition A may not be concluded until the element temperature becomes higher than the activity judgment temperature by ΔT, which is a temperature corresponding to the element impedance tolerance.

In the present embodiment, condition B is established so as to be satisfied when the element temperature is equal to the activity judgment temperature (e.g., 650° C.) plus ΔT. In other words, conditions A and B are simultaneously satisfied when the error contained in the sensor element 14 is equal to the tolerance. Therefore, when step 144 is performed, the activation of the sensor element 14 is judged when condition A is satisfied in a situation where the deviation of the element impedance from the element temperature is within the tolerance. If, on the other hand, the deviation is not within the tolerance, the activity of the sensor element 14 is judged when condition B is satisfied. In other words, when step 144 is performed, the activity judgment can be completely formulated before the element temperature reaches the upper limit of the tolerance (activity judgment temperature+ΔT) no matter what error is superposed over the element impedance. Therefore, the routine shown in FIG. 7 properly prevents the activity judgment from being substantially delayed by the deterioration of the sensor element 14.

In the routine shown in FIG. 7, if it is found in step 142 that the activity judgment end flag xactst is ON, it can be concluded that the sensor element 14 once reached the activity judgment temperature after internal combustion engine startup. In such a case, step 148 is performed to judge whether the value of the element impedance Z keeps the value equal to or smaller than the activity judgment value Zact (Z≦Zact?). If the obtained judgment result indicates that Z≦Zact, step 150 is performed to turn ON the activity flag xact for the purpose of indicating that the sensor element 14 remains active. If, on the other hand, the obtained judgment result does not indicate that Z≦Zact, step 152 is performed to turn OFF the activity flag xact because it is concluded that the sensor element 14 is rendered inactive for some reason.

As described above, while the sensor element 14 exhibits an initial characteristic, the routine shown in FIG. 7 can formulate an activity judgment, which is mainly based on the judgment of condition A, immediately after the activity judgment temperature is actually reached by the sensor element 14. Even after the deterioration of the sensor element 14 progresses, the activity judgment can be formulated at latest when the actual element temperature reaches the activity judgment temperature plus ΔT. Therefore, the device according to the present embodiment can promptly complete the activity judgment at all times by judging the deterioration of the sensor element 14 in real time when the air-fuel ratio sensor 10 warms up and without resort to any learning process.

The first embodiment, which has been described above, judges whether the activity judgment heat amount is reached by the amount of heat received by the sensor element 14 based on the intake air amount cumulative value GAsum (based on whether GAsum≧GAsumtg is satisfied). However, the present invention is not limited to the use of such a judgment method. For example, the judgment may alternatively be formulated in accordance with the cumulative period of time during which the heater 26 has been powered since internal combustion engine startup, the cumulative amount of electrical power supplied to the heater 26 after internal combustion engine startup, or the cumulative amount of fuel injection. These alternative judgment methods can be implemented, for instance, by calculating in step 130 the period of time during which the heater 26 is powered, the amount of electrical power supplied to the heater 26, or the cumulative amount of fuel injection, by calculating in step 140 the sensor activity judgment heater power application time, sensor activity judgment power supply cumulative value, or sensor activity judgment fuel injection amount cumulative value, and by judging in step 144 whether the heater power application time≧sensor activity judgment heater power application time, whether the heater power supply cumulative value≧sensor activity judgment power supply cumulative value, or whether the fuel injection amount cumulative value≧sensor activity judgment fuel injection amount cumulative value instead of judging whether GAsum≧GAsumtg.

Further, the first embodiment, which has been described above judge whether the activity judgment heat amount is reached by the amount of heat received by the sensor element 14 based solely on the intake air amount cumulative value GAsum to. However, the present invention is not limited to the use of such a judgment method. More specifically, whether the activity judgment heat amount is reached by the amount of heat received by the sensor element 14 may alternatively be determined by using a combination of at least two of the following four conditions: (1) Whether the sensor activity judgment intake air amount cumulative value is reached by the intake air amount cumulative value GAsum; (2) Whether the sensor activity judgment heater power application time is reached by the heater power application time; (3) Whether the sensor activity judgment power supply amount cumulative value is reached by the cumulative amount of power supply to the heater 26 after internal combustion engine startup; and (4) Whether the sensor activity judgment fuel injection amount cumulative value is reached by the fuel injection amount.

Furthermore, the first embodiment described above varies the sensor activity judgment intake air amount cumulative value GAsumtg in accordance with the startup cooling water temperature TWI (see FIG. 10). However, the present invention is not limited to the use of such a method. A fixed value may alternatively be used as a substitute for the sensor activity judgment intake air amount cumulative value GAsumtg without regard to the cooling water temperature TWI (this also holds true for the sensor activity judgment heater power application time, sensor activity judgment power supply amount cumulative value, and sensor activity judgment fuel injection amount cumulative value).

Second Embodiment

A second embodiment of the present invention will now be described with reference to FIGS. 11 through 13. The device according to the second embodiment is implemented when the microcomputer 34 within the first embodiment executes a routine shown in FIG. 11, which will be described later, in place of the routine shown in FIG. 7.

The first embodiment, which has been described earlier, uses the intake air amount cumulative value GAsum as a substitute for the amount of heat received by the sensor element 14. Further, the first embodiment varies the sensor activity judgment intake air amount cumulative value GAsumtg in accordance with the startup cooling water temperature TWI so that the value GAsumtg is consistent with the intake air amount cumulative value GAsum, which is required for actually activating the sensor element 14.

The amount of heat received by the sensor element 14 after internal combustion engine startup is mainly determined in accordance with the total amount of heat generated by the heater 26. The total amount of heat generated by the heater 26 is determined by the amount of heat generated per unit time by the heater 26 and the period of time during which the heater 26 is powered. The amount of heat generated per unit time by the heater 26 varies with the voltage applied to the heater 26. Therefore, if the battery voltage changes while the heater power application time remains unchanged, the amount of heat received by the sensor element 14 changes. Meanwhile, a significant change occurs in the battery voltage in accordance with the battery condition. Accordingly, for accurately judging whether the activity judgment heat amount is reached by the amount of heat received by the sensor element 14, it is essential to set the activity judgment heat amount (GAsumtg) while considering the voltage applied to the heater for warm-up (e.g., battery voltage) as well as the element temperature prevailing at the beginning of warm-up (TWI).

Figure 11:
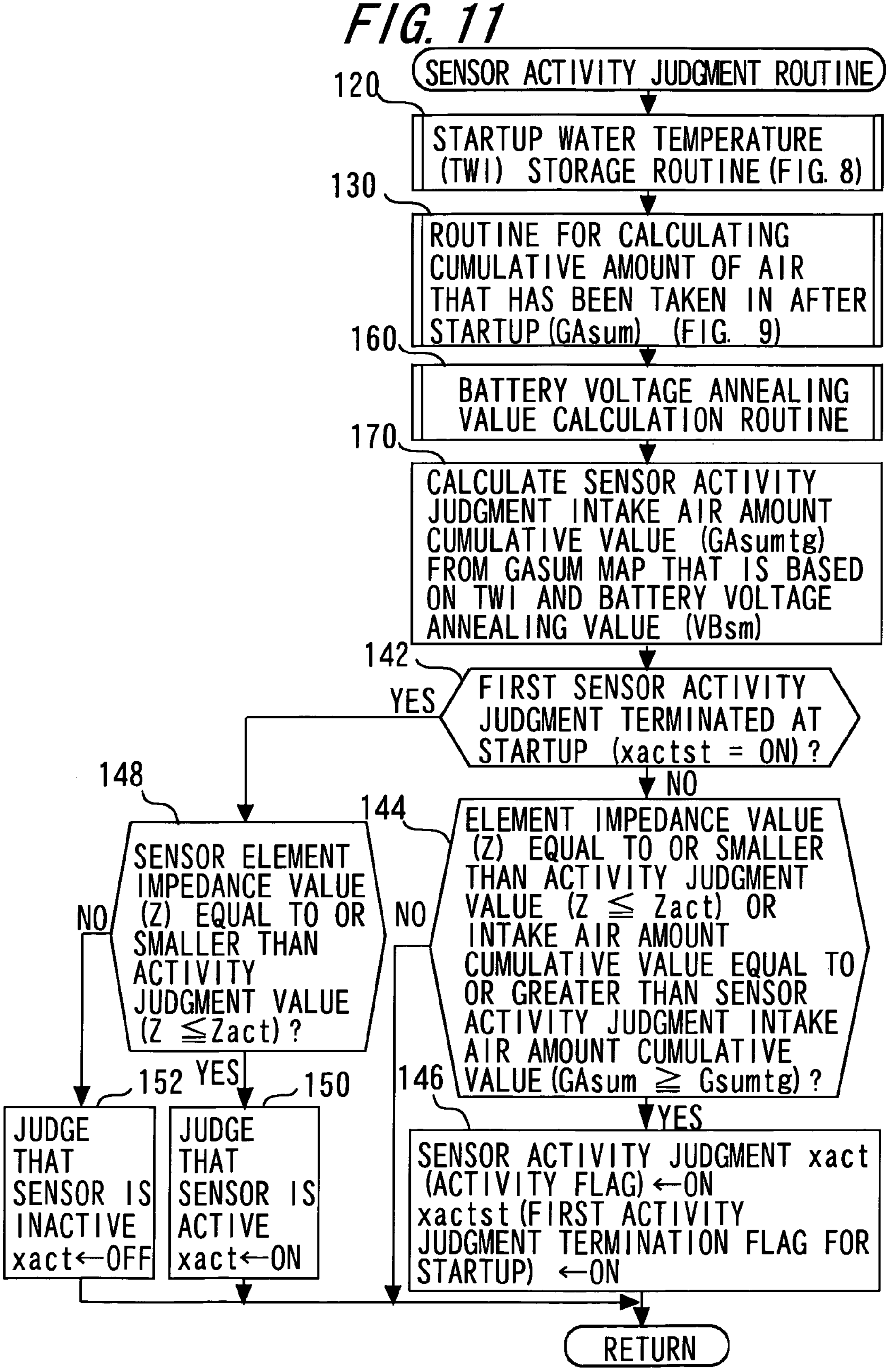
FIG. 11 is a flowchart illustrating an intake air amount cumulative value calculation routine that is executed in a second embodiment of the present invention.

FIG. 11 is a flowchart illustrating a sensor activity judgment routine that the present embodiment executes to meet the above requirements. The routine shown in FIG. 11 is the same as the routine shown in FIG. 7 except that steps 130 and 140 are replaced by steps 160 and 170. Like steps in FIGS. 7 and 11 are assigned the same reference numerals and will be briefly described or will not be described at all.

When the intake air amount cumulative value calculation routine is terminated in step 130, the routine shown in FIG. 11 proceeds to execute a battery voltage smoothing value (VBsm) calculation routine (step 160). This routine performs a process for calculating the average value of a battery voltage VB that prevails during the interval between the instant at which the internal combustion engine starts up and the instant at which the warm-up of the sensor element 14 terminates. The calculated average value is handled as a battery voltage smoothing value VBsm.

Figures 12, 13:
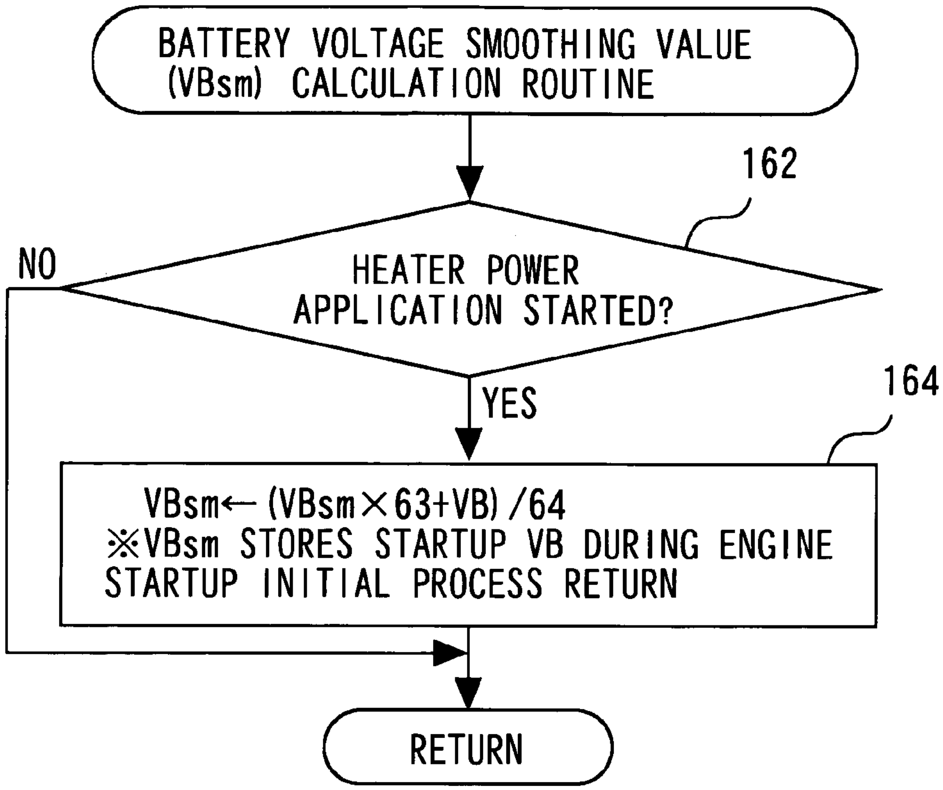
FIG. 12 is a flowchart illustrating a battery voltage smoothing value calculation routine that is executed in the second embodiment of the present invention.
FIG. 13 is a typical map illustrating a sensor activity judgment intake air amount GAsumtg that is referenced when the routine shown in FIG. 11 is executed.

FIG. 12 is a flowchart illustrating a battery voltage smoothing value calculation routine that is executed in step 160. This routine first performs step 162 to judge whether the power application to the heater 26 is already started after internal combustion engine startup. If the obtained judgment result indicates that heater power application is not started, the current processing cycle comes to an immediate end. If, on the other hand, the obtained judgment result indicates that heater power application is already started, the routine calculates the battery voltage VBsm as indicated below:

$$VBsm=(VBsm\times 63+VB)/64 \quad \text{Equation (1)}$$

The value VBsm on the left side of Equation (1) above is the latest battery voltage smoothing value, which is calculated in the current processing cycle. The value VBsm on the right side of the equation is the battery voltage smoothing value VBsm that was calculated in the previous processing cycle. The value VB on the right side of the equation is the battery voltage VB that is detected in the current processing cycle. According to this equation, the battery voltage smoothing value VBsm can be updated to the latest value by allowing the latest battery voltage VB to be reflected at a ratio of 1/64 in each processing cycle.

In the routine shown in FIG. 11, when the battery voltage smoothing value routine terminates, step 170 is followed to perform a process for calculating the sensor activity judgment intake air amount cumulative value (GAsumtg). In the present embodiment, the value GAsumtg is calculated based on the startup cooling water temperature TWI and battery voltage smoothing value VBsm for the aforementioned reason.

FIG. 13 is a typical map illustrating the value GAsumtg that the microcomputer 34 stores in accordance with the present embodiment. The map is organized so that the lower the startup cooling water temperature TWI is and the lower the battery voltage VBsm is, the greater the sensor activity judgment intake air amount cumulative value GAsumtg becomes. According to this map, amount of heat required for warming up the sensor element 14 becomes larger due to a low startup cooling water temperature TWI, or the heater powered period of time becomes longer to warm up the sensor element 14 due to a low battery voltage VB, the value set as the sensor activity judgment intake air amount cumulative value GAsumtg becomes greater. In the device according to the present embodiment, therefore, the minimum GAsum value that is adequate for concluding that the activity temperature is reached by the sensor element 14 can always be set as the GAsumtg value without regard to the element temperature prevailing at the beginning of warm-up and the battery voltage VB for a warm-up process.

The process performed subsequently to step 170 of the routine shown in FIG. 11 is the same as the process performed within the routine shown in FIG. 7 (steps 142 through 152). The process is performed to formulate an activity judgment of the sensor element 14 depending on whether the element impedance Z is lowered below the activity judgment value Zact (condition A) or depending on whether the sensor activity judgment intake air amount cumulative value GAsumtg is reached by the intake air amount cumulative value GAsum (condition B). In the present embodiment, the battery voltage VB is reflected in the sensor activity judgment intake air amount cumulative value GAsumtg. Therefore, the activity judgment based on condition B can be formulated with higher accuracy than in the first embodiment. As a result, the device according to the present embodiment can not only provide the same advantages as the device according to the first embodiment, but also judge the activity of the sensor element 14 with higher accuracy than the device according to the first embodiment.

The second embodiment, which has been described above, judges whether the activity judgment heat amount is reached by the amount of heat received by the sensor element 14 based on the intake air amount cumulative value GAsum to. However, the present invention is not limited to the use of such a judgment method. For example, such a judgment may alternatively be formulated in accordance with the cumulative period of time during which the heater 26 has been powered since internal combustion engine startup, the cumulative amount of electrical power supplied to the hater 26 after internal combustion engine startup, or the cumulative amount of fuel injection (refer to the alternative judgment methods for the first embodiment).

Further, the second embodiment, which has been described above, notes only the intake air amount cumulative value GAsum to judge whether the activity judgment heat amount is reached by the amount of heat received by the sensor element 14. However, the present invention is not limited to the use of such a judgment method. More specifically, whether the activity judgment heat amount is reached by the amount of heat received by the sensor element 14 may alternatively be determined by using a combination of at least two of the following four conditions: (1) Whether the sensor activity judgment intake air amount cumulative value is reached by the intake air amount cumulative value GAsum; (2) Whether the sensor activity judgment heater power application time is reached by the heater power application time; (3) Whether the sensor activity judgment power supply amount cumulative value is reached by the cumulative amount of power supply to the heater 26 after internal combustion engine startup; and (4) Whether the sensor activity judgment fuel injection amount cumulative value is reached by the fuel injection amount.

Third Embodiment

A third embodiment of the present invention will now be described with reference to FIGS. 14 through 16. The device according to the third embodiment is implemented when the microcomputer 34 within the first or second embodiment executes a routine shown in FIG. 14, which will be described later, in place of the routine shown in FIG. 7 or 11.

As described earlier, the first and second embodiments are configured so that condition A is satisfied prior to condition B at an early stage, and that condition B is satisfied prior to condition A when the sensor element 14 deteriorates to an intolerable extent. If condition B is satisfied prior to condition A, it can be judged that the sensor element 14 has deteriorated. In the mean time, if the sensor element 14 is deteriorated so that the element impedance Z shifts in the increasing direction, the element impedance Z does not decrease to the target impedance Ztg when the activity temperature (700° C.) is reached by the sensor element. If, in this instance, the target impedance Ztg is constant, the sensor element 14 will be overheated in the feedback control region of the heater 26. Therefore, the device according to the present embodiment judges whether condition B is satisfied prior to condition A. When condition B is satisfied, the device according to the present embodiment shifts the target impedance Ztg in the increasing direction.

Figure 14:
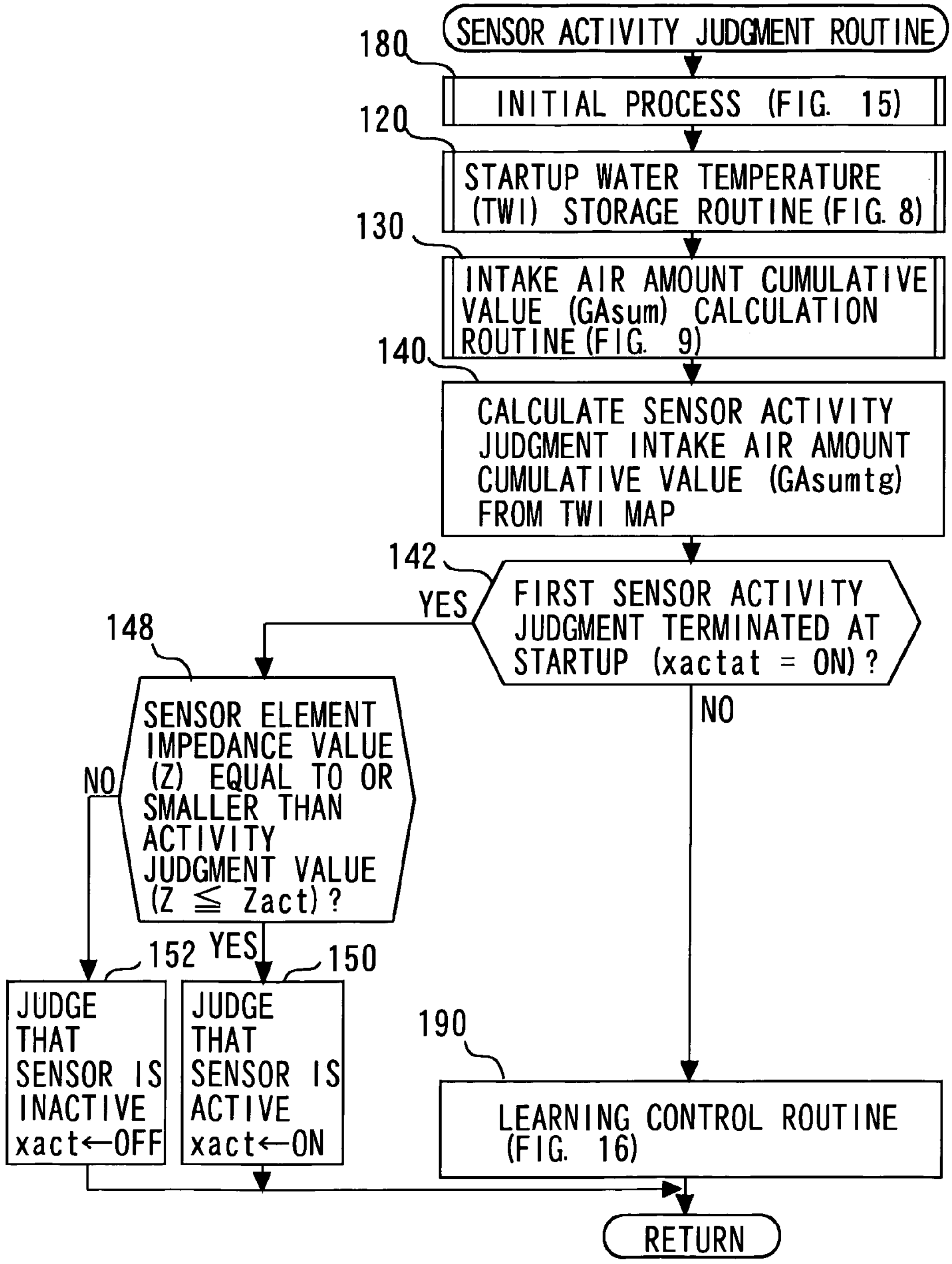
FIG. 14 is a flowchart illustrating an intake air amount cumulative value calculation routine that is executed in a third embodiment of the present invention.
Figure 15:
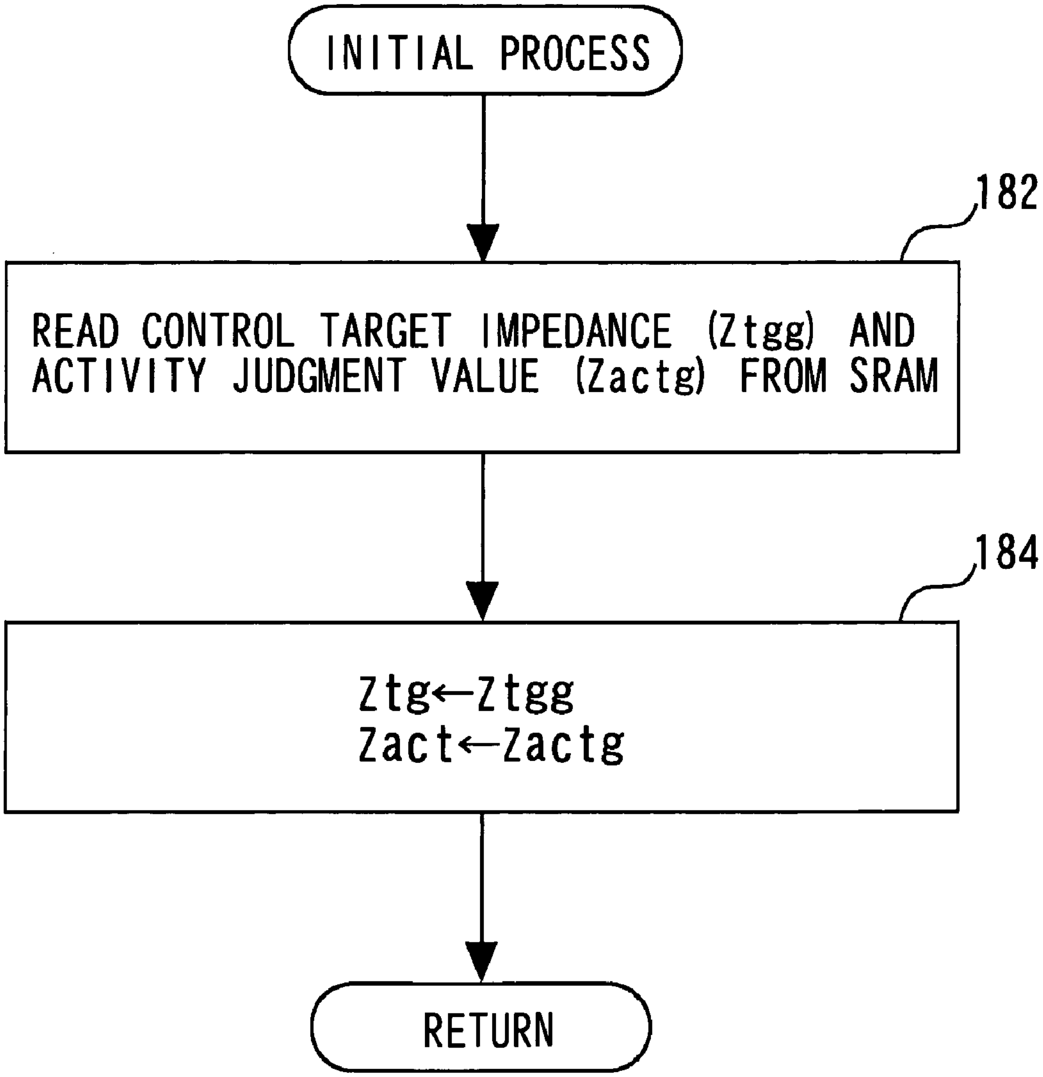
FIG. 15 is a flowchart illustrating an initial processing routine that is executed in the third embodiment of the present invention.

FIG. 14 is a flowchart illustrating a sensor activity judgment routine that the microcomputer 34 executes to implement the above functionality in accordance with the present embodiment. The routine shown in FIG. 11 is the same as the routine shown in FIG. 7 except that step 180 precedes step 130, and that steps 144 and 146 are replaced by step 190. Like steps in FIGS. 7 and 14 are assigned the same reference numerals and will be briefly described or will not be described at all.

Immediately after the routine shown in FIG. 14 is started, an initial process is performed (step 180). The initial process is performed as indicated in a flowchart that is shown in FIG. 15. More specifically, steps 182 and 184 are sequentially performed. In step 182, a process is performed to read target impedance learning value Ztgg and an activity judgment learning value Zactg from an SRAM (not shown) that is connected to the microcomputer 34. In step 184, a process is performed to set the above learning values Ztgg and Zactg as the target impedance Ztg and activity judgment value Zact, respectively.

In the routine shown in FIG. 14, if it is found in step 142 that the activity judgment end flag xactst is not ON, step 190 is performed to execute a learning control routine. The learning control routine is executed to learn the target impedance learning value Ztgg and activity judgment learning value Zactg.

Figure 16:
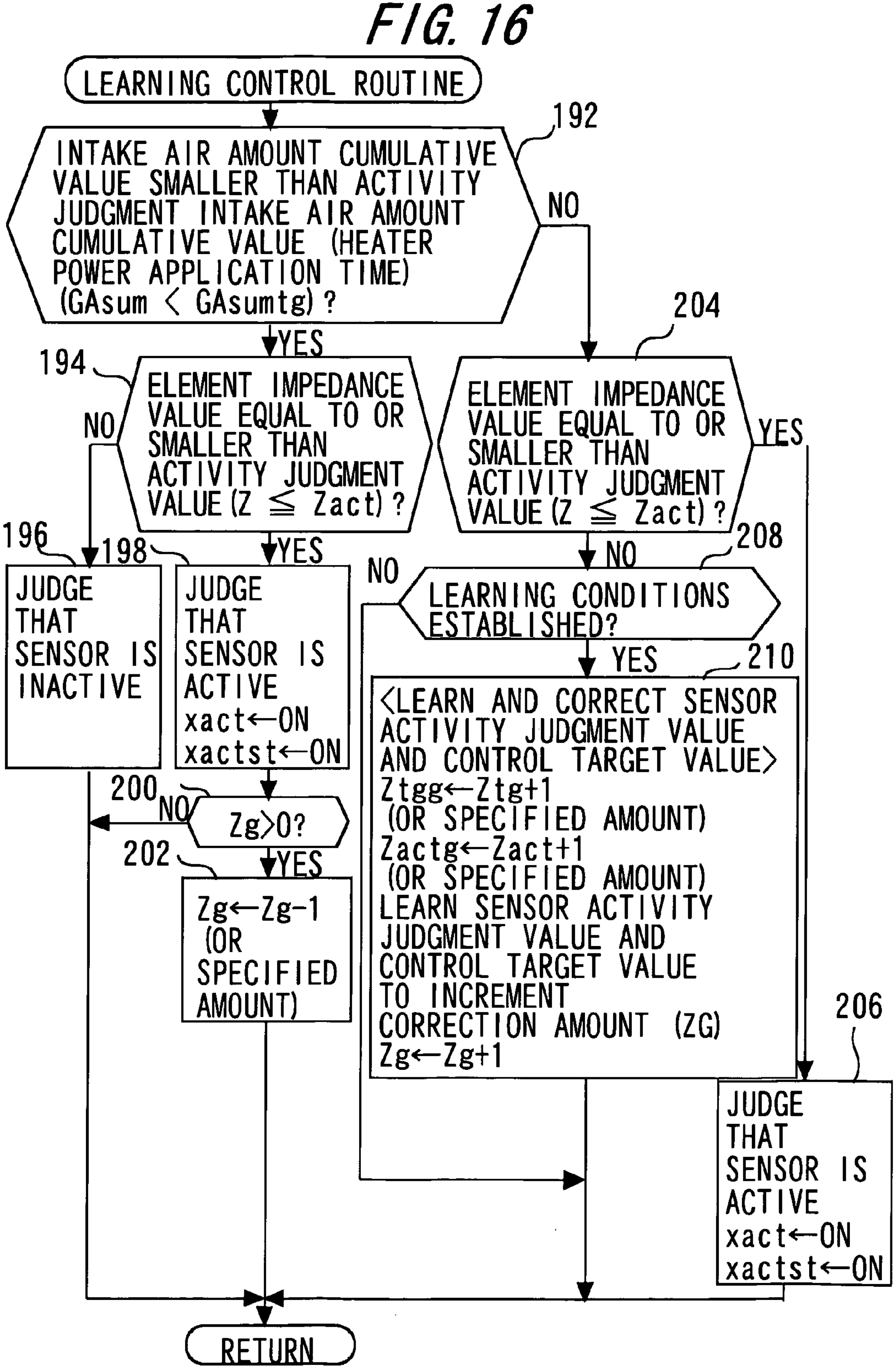
FIG. 16 is a flowchart illustrating a learning control routine that is executed in the third embodiment of the present invention.

FIG. 16 is a flowchart illustrating a learning control routine that is executed in step 190. In the routine shown in FIG. 16, step 192 is first performed to judge whether the intake air amount cumulative value GAsum is smaller than the sensor activity judgment intake air amount cumulative value GAsumtg. In other words, step 192 is performed to judge whether condition B, which is described earlier, is satisfied.

If it is found that GAsum<GAsum (condition B is not satisfied), it can be concluded that the activity judgment of the sensor element 14 cannot be formulated as far as it is based on the amount of received heat. In this instance, the routine proceeds to judge whether the element impedance Z is equal to or smaller than the activity judgment value Zact, that is, whether condition A is satisfied (step 194).

If it is not found in step 194 that Z≦Zact, it can be concluded that the activity judgment of the sensor element 14 cannot be formulated when it is based on the element impedance Z. In this instance, step 196 is performed to judge that the sensor element 14 is inactive, and then the learning control routine terminates.

If, on the other hand, it is found in step 194 that Z≦Zact, it can be concluded that the activity judgment of the sensor element 14 can be formulated when it is based on the element impedance Z. In this instance, it can be concluded that condition A is satisfied prior to condition B, and that the sensor element 14 has become active. In this instance, the activity judgment of the sensor element 14 is formulated firstly, thereby the activity judgment flag xact and activity judgment end flag xactst are both turned ON (step 198).

Next, step 200 is performed to judge whether a learning correction amount Zg is a positive value. In the routine shown in FIG. 16, when the deterioration of the sensor element 14 is recognized, the activity judgment value Zact (strictly the activity judgment learning value) is corrected (incremented) in the positive direction as described later. The learning correction amount Zg is a coefficient that corresponds to the correction amount for its activity judgment value Zact. Therefore, when Zg>0, it can be concluded that the activity judgment value Zact is increased above the initial level for correction purposes.

The process of step 200 is performed in a situation where satisfaction of condition A (Z≦Zact) is judged although the activation of the sensor element 14 cannot be judged by the condition B (GAsum≧GAsumtg). If the value Zact is excessively great in this instance, the activity of the sensor element 14 is judged although the activity judgment temperature is not reached by the sensor element 14. When the learning correction amount Zg is a positive value, it can be judged that the activity judgment value Zact may be an excessive value as a result of learning. Therefore, if Zg>0 is judged in step 200, step 202 is performed to decrement the learning correction amount Zg for the purpose of delaying the satisfaction of condition A. When the learning correction amount Zg is decremented in this manner, it is assumed that the target impedance learning value Ztgg and activity judgment learning value Zactg are decremented in the same manner.

If, on the other hand, the judgment result obtained in step 200 does not indicate that Zg>0, it can be concluded that the activity judgment value Zact cannot be rendered excessive for correction purposes. In this instance, condition A is satisfied prior to condition B as originally set up, and it can therefore be concluded that the activation of the sensor element 14 is judged merely on the basis of the satisfaction of condition A. In this case, the learning control routine terminates without performing any subsequent process.

In the routine shown in FIG. 16, if the judgment result obtained in step 192 does not indicate that GAsum<GAsumtg, the next step is performed to judge whether the element impedance Z is equal to or smaller than the activity judgment value Zact. If the obtained judgment result indicates that Z≦Zact, it can be concluded that conditions A and B are both satisfied. In this instance, step 206 is performed to formulate an activity judgment of the sensor element 14, and then the current processing cycle terminates.

If, on the other hand, the judgment result obtained in step 204 does not indicate that Z≦Zact, it can be concluded when the activity judgment heat amount is reached by the amount of heat received by the sensor element 14 (condition B is satisfied) that the element impedance Z is not lowered to the activity judgment value Zact (condition A is not satisfied). In this instance, it is judged that the element impedance Z is likely to have shifted in the increasing direction in accordance with the deterioration of the sensor element 14. Step 208 is then performed to judge whether learning conditions are satisfied.

In step 208, it is judge whether the satisfaction of the condition for concluding that the sensor element 14 has deteriorated can be determined from the fact in which condition B becomes satisfied prior to condition A. More specifically, step 208 is performed to judge whether a peculiar warm-up environment exists for the sensor element 14 by determining, for instance, whether the startup cooling water temperature TWI is equal to or lower than a learning permission temperature (whether the internal combustion engine is cold started). If the obtained judgment result indicates that the learning conditions are not satisfied, the current processing cycle comes to an immediate end. If, on the other hand, the learning conditions are satisfied, step 210 is performed to increment the target impedance learning value Ztgg, activity judgment learning value Zactg, and learning correction amount Zg.

When steps 202 and 210 of the routine shown in FIG. 6 are performed, the target impedance learning value Ztgg, activity judgment learning value Zactg, and learning correction amount Zg are updated. The values updated in the above manner are then written into the aforementioned SRAM. When the routine shown in FIG. 14 performs an initial process in the aforementioned step 180, the latest learning values Ztgg and Zactg are constantly set as the target impedance Ztg and activity judgment value Zact. Therefore, the device according to the present embodiment prevents the satisfaction of condition A from being unduly delayed after a considerable deterioration of the sensor element 14 and prevents the sensor element 14 from being overheated in the feedback control region of the heater 26.

In the third embodiment, which has been described above, the routine shown in FIG. 16 performs steps 210 and 202 to increment or decrement the Ztgg, Zactg, and Zg values, that is, to increment or decrement such learning values by one at a time. However, the present invention is not limited to the use of such a method. More specifically, steps 210 and 202 may alternatively be performed to increase or decrease the learning values by a predefined value instead of one.

Further, the third embodiment, which has been described above, learns the activity judgment value Zact as well as the target impedance Ztg in accordance with the deterioration of the sensor element 14. However, the present invention is not limited to the use of such a learning method. More specifically, an alternative is to learn only the target impedance Ztg while leaving the activity judgment value Zact fixed.

The features and advantageous result of the present invention are summarized as follows.

The first aspect of the present invention relates to an exhaust gas sensor control device for an exhaust gas sensor that is mounted in an exhaust path of an internal combustion engine. The exhaust gas sensor includes a sensor element that becomes active when an activity temperature is reached. The exhaust gas sensor control device includes: an impedance detection device for detecting an element impedance of the sensor element; an impedance judgment device for judging whether the element impedance is lowered to an activity judgment value; a received heat amount estimation device for estimating the amount of heat received by the sensor element; a heat amount judgment device for judging whether an activity judgment heat amount is reached by the amount of heat received; and an activity judgment device for formulating an activity judgment of the exhaust gas sensor when an affirmative judgment is executed either by the impedance judgment device or by the heat amount judgment device.

The second aspect of the present invention relates to the exhaust gas sensor control device according to the first aspect of the present invention. In this aspect, the exhaust gas sensor includes a heater for heating the sensor element. The exhaust gas sensor control device further includes a heater drive device for driving the heater in an environment where the activation of the exhaust gas sensor is demanded. The heat amount judgment device determines whether an activity judgment heat amount is reached by the amount of heat received by the sensor element based on the result of whether an activity judgment time is reached by a period of time during which the heater is powered after the activation of the exhaust gas sensor is demanded.

The third aspect of the present invention relates to the exhaust gas sensor control device according to the first aspect of the present invention. In this aspect, the exhaust gas sensor includes a heater for heating the sensor element. The exhaust gas sensor control device further includes a heater drive device for driving the heater in an environment where the activity of the exhaust gas sensor is demanded. The heat amount judgment device determines whether an activity judgment heat amount is reached by the amount of heat received by the sensor element based on the result of whether an activity judgment power supply amount cumulative value is reached by the cumulative amount of power that has been supplied to the heater after the activity of the exhaust gas sensor is demanded.

The fourth aspect of the present invention relates to the exhaust gas sensor control device according to the first aspect of the present invention. In this aspect, the heat amount judgment device determines whether an activity judgment heat amount is reached by the amount of heat received by the sensor element based on the result of whether an activity judgment air amount is reached by the cumulative amount of air that has been taken in after internal combustion engine startup.

The fifth aspect of the present invention relates to the exhaust gas sensor control device according to the first aspect of the present invention. In this aspect, the heat amount judgment device determines whether an activity judgment heat amount is reached by the amount of heat received by the sensor element based on the result of whether an activity judgment fuel amount is reached by the cumulative amount of fuel that has been supplied to an internal combustion engine after internal combustion engine startup.

The sixth aspect of the present invention relates to the exhaust gas sensor control device according to any one of the first to fifth aspects of the present invention. In this aspect, the exhaust gas sensor control device further includes a startup water temperature detection device for detecting a startup cooling water temperature of an internal combustion engine. The heat amount judgment device includes an activity judgment heat amount setup device for increasing the activity judgment heat amount with a decrease in the startup cooling water temperature.

The seventh aspect of the present invention relates to the exhaust gas sensor control device according to any one of the first to sixth aspects of the present invention. In this aspect, the exhaust gas sensor includes a heater for heating the sensor element. The exhaust gas sensor control device further includes a heater drive device for driving the heater in an environment where the activity of the exhaust gas sensor is demanded; and a battery voltage detection device for detecting a battery voltage. The received heat amount estimation device includes a warm-up period correlation value calculation device for detecting a warm-up period correlation value that correlates with a warm-up period for the sensor element; and wherein the heat amount judgment device includes a device for judging, when a sensor activity judgment correlation value is reached by the warm-up period correlation value, that the activity judgment heat amount is reached by the amount of heat received, and a judgment value setup device for increasing the sensor activity judgment correlation value with a decrease in a battery voltage prevailing during a warm-up process for the sensor element.

The eighth aspect of the present invention relates to the exhaust gas sensor control device according to any one of the first to seventh aspects of the present invention. In this aspect, the exhaust gas sensor includes a heater for heating the sensor element. The exhaust gas sensor control device further includes a heater drive device for driving the heater in an environment where the activity of the exhaust gas sensor is demanded, the heater drive device including a feedback control device for exercising feedback control over the heater so that the element impedance coincides with target impedance; a deterioration judgment device for judging the deterioration of the sensor element when the element impedance is judged to be excessive for the amount of heat received by the sensor element; and a target impedance correction device for increasing the target impedance for correction purposes when the sensor element is judged to have deteriorated.

The ninth aspect of the present invention relates to the exhaust gas sensor control device according to any one of the first to eighth aspect of the present invention. In this aspect, the exhaust gas sensor includes a heater for heating the sensor element. The exhaust gas sensor control device further includes a heater drive device for driving the heater in an environment where the activity of the exhaust gas sensor is demanded. The heater drive device including a feedback control device for exercising feedback control over the heater so that the element impedance coincides with target impedance. The exhaust gas sensor control device also includes a deterioration judgment device for judging the deterioration of the sensor element when the element impedance is judged to be excessive for the amount of heat received by the sensor element; and an activity judgment value correction device for increasing the activity judgment value for correction purposes when the sensor element is judged to have deteriorated.

The tenth aspect of the present invention relates to the exhaust gas sensor control device according to the eighth or ninth aspect of the present invention. In this aspect, the condition to be judged by the impedance judgment device and the condition to be judged by the received heat amount estimation device are predefined so that the former condition is satisfied prior to the latter condition when the sensor element exhibits an initial impedance; and wherein the deterioration judgment device judges that the element impedance is excessive for the amount of heat received when the latter condition is satisfied prior to the former condition.

The eleventh aspect of the present invention relates to an exhaust gas sensor control device for an exhaust gas sensor that is mounted in an exhaust path of an internal combustion engine. The exhaust gas sensor includes a sensor element that becomes active when an activity temperature is reached. The exhaust gas sensor control device includes impedance detection means for detecting an element impedance of the sensor element; impedance judgment means for judging whether the element impedance is lowered to an activity judgment value; received heat amount estimation means for estimating the amount of heat received by the sensor element; heat amount judgment means for judging whether an activity judgment heat amount is reached by the amount of heat received; and activity judgment means for formulating an activity judgment of the exhaust gas sensor when an affirmative judgment is executed either by the impedance judgment means or by the heat amount judgment means.

In the first or eleventh aspect of the present invention, the activation of the exhaust gas sensor can be judged when the element impedance is lowered to the activity judgment value or when the activity judgment heat amount is reached by the amount of heat received by the sensor element. In other words, even if the decrease of the element impedance to the activity judgment value is delayed by sensor element deterioration, the sensor element activation can be judged without delay by formulating a judgment in accordance with the amount of heat received by the sensor element. As described above, the present invention promptly judges the sensor element activity at all times without resort to activity judgment value learning.

In the second aspect of the present invention, whether the activity judgment heat amount is reached by the amount of heat received by the sensor element can be accurately determined by judging whether the activity judgment time is reached by the heater power application time.

In the third aspect of the present invention, whether the activity judgment heat amount is reached by the amount of heat received by the sensor element can be accurately determined by judging whether the activity judgment power supply amount cumulative value is reached by the cumulative amount of power supply to the heater.

In the fourth aspect of the present invention, whether the activity judgment heat amount is reached by the amount of heat received by the sensor element can be accurately determined by judging whether the activity judgment intake air amount is reached by the cumulative amount of air that has been taken in after internal combustion engine startup.

In the fifth aspect of the present invention, whether the activity judgment heat amount is reached by the amount of heat received by the sensor element can be accurately determined by judging whether the activity judgment fuel amount is reached by the cumulative amount of fuel supplied to the internal combustion engine.

In the sixth aspect of the present invention, the lower the startup cooling water temperature of the internal combustion engine is, the larger the activity judgment heat amount becomes. The amount of heat required for activating the exhaust gas sensor increases with a decrease in the startup cooling water temperature and with a decrease in the sensor element temperature prevailing at the beginning of warm-up. When the environment prevailing at the beginning of warm-up is considered, the present invention enhances the accuracy of activity judgment concerning the amount of heat received by the sensor element.

In the seventh aspect of the present invention, it can be concluded that the activity judgment heat amount is reached by the received heat amount when the period during which the heater warms up the sensor element corresponds to the sensor activity judgment correlation value. Further, the seventh aspect of the present invention allows the sensor activity judgment correlation value to increase with a decrease in the battery voltage prevailing during a sensor element warm-up process. The amount of heat generated by the heater decreases with a decrease in the battery voltage. Further, the period of time required for sensor element activation increases with a decrease in the amount of heat generated by the heater. Since the sensor activity judgment correlation value is great in a situation where the battery voltage is low so that the heater generates a small amount of heat, the present invention constantly formulates an accurate activity judgment in accordance with the received heat amount no matter what the battery voltage is.

In the eighth aspect of the present invention, deterioration of the sensor element can be determined when excessive element impedance is maintained although an adequate amount of heat is received by the sensor element. Further, a situation where the sensor element is properly controlled to an activity temperature by exercising heater feedback control can be provided by increasing the target impedance for correction purposes when the sensor element is found to have deteriorated.

In the ninth aspect of the present invention, deterioration of the sensor element can be determined when excessive element impedance is maintained although an adequate amount of heat is received by the sensor element. Further, a situation where a proper activity judgment is formulated in accordance with the element impedance can be provided by increasing the activity judgment value for correction purposes when the sensor element is found to have deteriorated. Therefore, the present invention can prevent the activity judgment from being delayed by sensor element deterioration.

In the tenth aspect of the present invention, it is possible to execute an activity judgment by performing a conditional check based of the element impedance as long as in a situation where the sensor element exhibits initial impedance. Further, it can be concluded that the element impedance rendered excessive and the sensor element is deteriorated at the time point when a situation is provided in which the activation is determined by the judgment based on the amount of heat received by the sensor element with the progress of the sensor element deterioration. As described above, the present invention uses the result of the conditional check for permitting prompt activity judgment and accurately judges whether the element impedance is deteriorated without having to perform a new conditional check.

In the first embodiment, which has been described earlier, the "impedance detection device" according to the first aspect of the prevent invention or the "impedance detection means" according to the eleventh aspect of the present invention is implemented when the microcomputer 34 detects an element impedance. The "impedance judgment device" according to the first aspect of the present invention or the "impedance judgment means" according to the eleventh aspect of the present invention is implemented when step 144 is performed to judge whether condition A is satisfied. The "received heat amount estimation device" according to the first aspect of the present invention or the "received heat amount estimation means" according to the eleventh aspect of the present invention is implemented when the process in step 130 is performed. The "heat amount judgment device" according to the first aspect of the present invention or the "heat amount judgment means" according to the eleventh aspect of the present invention is implemented when step 144 is performed to judge whether condition B is satisfied. The "activity judgment device" according to the first aspect of the present invention or the "activity judgment means" according to the eleventh aspect of the present invention is implemented when the process in step 146 is performed. Further, in the first embodiment, which has been described earlier, the heater control circuit 38 corresponds to the "heater drive device" according to the second or third aspect of the present invention. The "startup water temperature detection device" according to the sixth aspect of the present invention is implemented when the microcomputer 34 performs the process in step 120.

In the second embodiment, which has been described earlier, the heater control circuit 38 corresponds to the "heater drive device" according to the seventh aspect of the present invention. The "battery voltage detection device" according to the seventh aspect of the present invention is implemented when the microcomputer 34 performs the process in step 160. The "warm-up period correlation value calculation device" according to the seventh aspect of the present invention is implemented when the process in step 130 is performed. The "device for judging that the activity judgment heat amount is reached by the received heat amount" according to the seventh aspect of the present invention is implemented when step 144 is performed to judge whether condition B is satisfied. The "judgment value setup device" according to the seventh aspect of the present invention is implemented when the process in step 170 is performed.

In the third embodiment, which has been described earlier, the heater control circuit 38 corresponds to the "heater drive device" according to the eighth or ninth aspect of the present invention. The "feedback control device" according to the eighth or ninth aspect of the present invention is implemented when the microcomputer 34 performs the process in step 116. The "deterioration judgment device" according to the eighth or ninth aspect of the present invention is implemented when the processes in steps 192 and 204 are performed. The "target impedance correction device" according to the eighth aspect of the present invention or the "activity judgment value correction device" according to the ninth aspect of the present invention is implemented when the process in step 210 is performed.

The invention claimed is:

1. An exhaust gas sensor control device for an exhaust gas sensor that is mounted in an exhaust path of an internal combustion engine, wherein said exhaust gas sensor includes a sensor element that becomes active when an activity temperature is reached, the exhaust gas sensor control device comprising:

an impedance detection device for detecting an element impedance of said sensor element;

an impedance judgment device for judging whether said element impedance is lowered to an activity judgment value;

a received heat amount estimation device for estimating an amount of heat received by said sensor element based on one or more operational parameters related to operation of the internal combustion engine other than said element impedance of said sensor element;

a heat amount judgment device for judging whether an activity judgment heat amount is reached in said sensor element based on the amount of heat received by said sensor element; and an activity judgment device for formulating an activity judgment of said exhaust gas sensor when an affirmative judgment is executed either by said impedance judgment device or by said heat amount judgment device.

2. The exhaust gas sensor control device according to claim 1, wherein said exhaust gas sensor includes a heater for heating the sensor element;

said exhaust gas sensor control device further comprising a heater drive device for driving said heater in an environment where the activation of said exhaust gas sensor is demanded;

wherein said heat amount judgment device determines whether an activity judgment heat amount is reached by the amount of heat received by said sensor element based on the result of whether an activity judgment time is reached by a period of time during which the heater is powered after the activation of said exhaust gas sensor is demanded.

3. The exhaust gas sensor control device according to claim 1, wherein said exhaust gas sensor includes a heater for heating the sensor element;

said exhaust gas sensor control device further comprises a heater drive device for driving said heater in an environment where the activity of said exhaust gas sensor is demanded;

wherein said heat amount judgment device determines whether an activity judgment heat amount is reached by the amount of heat received by said sensor element based on the result of whether an activity judgment power supply amount cumulative value is reached by the cumulative amount of power that has been supplied to the heater after the activity of said exhaust gas sensor is demanded.

4. The exhaust gas sensor control device according to claim 1, wherein said heat amount judgment device determines whether an activity judgment heat amount is reached by the amount of heat received by said sensor element based on the result of whether an activity judgment air amount is reached by the cumulative amount of air that has been taken in after internal combustion engine startup.

5. The exhaust gas sensor control device according to claim 1, wherein said heat amount judgment device determines whether an activity judgment heat amount is reached by the amount of heat received by said sensor element based on the result of whether an activity judgment fuel amount is reached by the cumulative amount of fuel that has been supplied to an internal combustion engine after internal combustion engine startup.

6. The exhaust gas sensor control device according to claim 1, further comprising:

a startup water temperature detection device for detecting a startup cooling water temperature of an internal combustion engine, wherein said heat amount judgment device includes an activity judgment heat amount setup device for increasing said activity judgment heat amount with a decrease in said startup cooling water temperature.

7. The exhaust gas sensor control device according to claim 1, wherein said exhaust gas sensor includes a heater for heating the sensor element, said exhaust gas sensor control device further comprising a heater drive device for driving said heater in an environment where the activity of said exhaust gas sensor is demanded; and a battery voltage detection device for detecting a battery voltage;

wherein said received heat amount estimation device includes a warm-up period correlation value calculation device for detecting a warm-up period correlation value that correlates with a warm-up period for said sensor element; and wherein said heat amount judgment device includes a device for judging, when a sensor activity judgment correlation value is reached by said warm-up period correlation value, that said activity judgment heat amount is reached by said amount of heat received, and a judgment value setup device for increasing said sensor activity judgment correlation value with a decrease in a battery voltage prevailing during a warm-up process for said sensor element.

8. The exhaust gas sensor control device according to claim 1, wherein said exhaust gas sensor includes a heater for heating said sensor element, said exhaust gas sensor control device further comprising;

a heater drive device for driving said heater in an environment where the activity of said exhaust gas sensor is demanded, said heater drive device including a feedback control device for exercising feedback control over said heater so that said element impedance coincides with target impedance;

a deterioration judgment device for judging the deterioration of the sensor element when said element impedance is judged to be excessive for the amount of heat received by said sensor element; and a target impedance correction device for increasing the target impedance for correction purposes when said sensor element is judged to have deteriorated.

9. The exhaust gas sensor control device according to claim 8, wherein the condition to be judged by said impedance judgment device and the condition to be judged by said received heat amount estimation device are predefined so that the former condition is satisfied prior to the latter condition when said sensor element exhibits an initial impedance; and wherein said deterioration judgment device judges that said element impedance is excessive for said amount of heat received when the latter condition is satisfied prior to the former condition.

10. The exhaust gas sensor control device according to claim 1, wherein said exhaust gas sensor includes a heater for heating said sensor element, said exhaust gas sensor control device further comprising;

a heater drive device for driving said heater in an environment where the activity of said exhaust gas sensor is demanded, said heater drive device including a feedback control device for exercising feedback control over said heater so that said element impedance coincides with target impedance;

a deterioration judgment device for judging the deterioration of the sensor element when said element impedance is judged to be excessive for the amount of heat received by said sensor element; and an activity judgment value correction device for increasing said activity judgment value for correction purposes when said sensor element is judged to have deteriorated.

11. An exhaust gas sensor control device for an exhaust gas sensor that is mounted in an exhaust path of an internal combustion engine, wherein said exhaust gas sensor includes a sensor element that becomes active when an activity temperature is reached, the exhaust gas sensor control device comprising:

impedance detection means for detecting an element impedance of said sensor element;

impedance judgment means for judging whether said element impedance is lowered to an activity judgment value;

received heat amount estimation means for estimating an amount of heat received by said sensor element based on one or more operational parameters related to operation of the internal combustion engine other than said element impedance of said sensor element;

heat amount judgment means for judging whether an activity judgment heat amount is reached in said sensor element based on the amount of heat received by said sensor element; and activity judgment means for formulating an activity judgment of said exhaust gas sensor when an affirmative judgment is executed either by said impedance judgment means or by said heat amount judgment means.

* * * * *